United States Patent
Shipman, Jr. et al.

(10) Patent No.: US 10,838,464 B1
(45) Date of Patent: Nov. 17, 2020

(54) INTERNAL SUPPORT FOR ELECTRONIC DEVICE AND METHOD FOR ENCASING AN ELECTRONIC DEVICE

(71) Applicant: Tech Friends, Inc., Jonesboro, AR (US)

(72) Inventors: Bobby L. Shipman, Jr., Jonesboro, AR (US); Bryan Taylor, Bono, AR (US); Jason Cochran, Jonesboro, AR (US); Joshua L. Parrish, Paragould, AR (US); Mark Haney, Jonesboro, AR (US); Bobby Shipman, III, Jonesboro, AR (US)

(73) Assignee: Tech Friends, Inc., Jonesboro, AR (US)

( * ) Notice: Subject to any disclaimer, the term of this patent is extended or adjusted under 35 U.S.C. 154(b) by 106 days.

(21) Appl. No.: 16/045,417

(22) Filed: Jul. 25, 2018

Related U.S. Application Data

(63) Continuation-in-part of application No. 16/033,045, filed on Jul. 11, 2018, now Pat. No. 10,678,302, which is a continuation-in-part of application No. 15/136,604, filed on Apr. 22, 2016, now Pat. No. 10,225,734, which is a continuation-in-part of application No. 14/923,271, filed on Oct. 26, 2015, now Pat. No. 10,256,645, which is a continuation-in-part of application No. 14/869,592, filed on Sep. 29, 2015, now Pat. No. 9,917,455.

(51) Int. Cl.
*G06F 1/16* (2006.01)

(52) U.S. Cl.
CPC .......... *G06F 1/1656* (2013.01); *G06F 1/1626* (2013.01); *G06F 1/1635* (2013.01); *G06F 1/1643* (2013.01)

(58) Field of Classification Search
CPC .... G06F 1/1656; G06F 1/1635; G06F 1/1643; G06F 1/1626
See application file for complete search history.

(56) References Cited

U.S. PATENT DOCUMENTS 5,357,061 A * 10/1994 Crutchfield ............. G06F 3/046
178/18.08
6,383,608 B1 * 5/2002 Burkett ............... B29C 44/1266
264/45.1

(Continued)

FOREIGN PATENT DOCUMENTS

GB        2558864 A *  7/2018  ........... G06F 1/1628

*Primary Examiner* — Dong-Chang Shiue
(74) *Attorney, Agent, or Firm* — Schrantz Law Firm, PLLC; Stephen D. Schrantz

(57) ABSTRACT

The housing provides layers of rigid material and cushioning around the components of a mobile electronic device, such as a tablet. The rigid material includes a positioning frame that positions the display, the battery, and the circuit board within the housing. Cushioning positioned exterior of the frame provides additional cushion around the components of the mobile electronic device. The housing partially encloses the components of the mobile electronic device and provides a viewing window for viewing the display. A support rib abuts a rear wall of the housing to increase the rigidity of the housing. Antimicrobial agents and/or fire-retardant agents added to the housing provide additional features to the housing.

19 Claims, 3 Drawing Sheets

(56) References Cited

U.S. PATENT DOCUMENTS

| | | | |
|---|---|---|---|
| 2004/0154941 A1* | 8/2004 | Montler | H01H 9/0242 |
| | | | 206/320 |
| 2011/0164365 A1* | 7/2011 | McClure | G06F 1/1637 |
| | | | 361/679.3 |
| 2013/0088815 A1* | 4/2013 | Hu | G06F 1/1628 |
| | | | 361/679.01 |
| 2014/0124521 A1* | 5/2014 | Brown | H05K 5/023 |
| | | | 220/756 |
| 2016/0094263 A1* | 3/2016 | Fathollahi | H04B 1/3888 |
| | | | 455/575.8 |

* cited by examiner

INTERNAL SUPPORT FOR ELECTRONIC DEVICE AND METHOD FOR ENCASING AN ELECTRONIC DEVICE

CROSS-REFERENCE TO RELATED APPLICATIONS

This application is a continuation in part of U.S. patent application Ser. No. 16/033,045 entitled SECURE CHARGING SYSTEM FOR ELECTRONIC DEVICES filed on Jul. 11, 2018 that is a continuation in part of U.S. patent application Ser. No. 15/136,604 entitled "SECURED STORAGE FOR ELECTRONIC DEVICES" that was filed on Apr. 22, 2016 which is a continuation in part of U.S. patent application Ser. No. 14/923,271 entitled "Protective Housing" that was filed on Oct. 26, 2015 which is a continuation in part of U.S. patent application Ser. No. 14/869,592 entitled "Charging Unit and System" that was filed on Sep. 29, 2015.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates to an internal support for the components of an electronic device and a housing that provides layers of rigid material and cushioning around the components of a mobile electronic device, such as a tablet. The rigid material includes a positioning frame that positions the display, the battery, and the circuit board. Cushioning positioned exterior of the frame provides additional cushion around the components of the mobile electronic device.

The housing partially encloses the components of the mobile electronic device while providing a viewing window for viewing the display. The housing provides a rigid material that at least partially encloses the electronic device. An outer cushioning layer may be located as the outermost surface to provide additional impact resistance. Different embodiments of the present invention may provide different types of outer layers depending on the environment in which the device is used. One embodiment provides a hard, rigid surface as the outermost surface of the housing. Another embodiment provides an outer cushioning layer as the outer layer of the housing.

A support rib abuts a rear wall of the housing to increase the rigidity of the housing. A wall extension extends inward into the housing to secure the support rib. The wall extension extends from the housing at an angle for positioning the cushioning and the support rib.

II. Description of the Known Art

Certain problems exist with the known art. The known art does not provide sufficient support, structure, and cushioning to the internal components of a mobile computing device. The known art does not provide sufficient protection for the device to limit damage from drops, throws, moisture, and other environmental factors. The present invention provides a housing that provides a rigid positioning frame that secures the internal components of the device within a protective layer, such as a cushioning layer. The rigid frame provides additional structure to the display, the touchscreen, and the circuit board to reduce the likelihood of twisting, torquing, cracking, or otherwise damaging the mobile electronic device.

Cushioning around the components and the positioning frame reduce exposure of the components to environmental factors. The foam limits the water, dust, moisture, and chemicals exposed to the components.

Known housings for tablets and other electronic devices provide unfettered access to the device. Known housings allow access to some buttons and other inputs that can be used to disable certain security features.

Known housings do not securely store the devices within the housing to prevent unauthorized access. Instead, people are allowed to freely remove the devices from the housing.

Therefore, the present invention is needed to provide a durable housing that reduces the likelihood of damaging the internal components of the mobile electronic device. The housing also reduces access to the mobile electronic device to prevent unauthorized tampering of the device. The present invention securely stores the device to limit access to features of the device.

SUMMARY OF THE INVENTION

The present invention relates to a protective housing for a mobile electronic device, including, but not limited to tablets, smart phones, mobile electronic devices, mobile computing devices, and other electronic devices. The mobile computing devices may include, but are not limited to, tablets, smart phones, iPads, iPods, iPhones, Android devices, Raspberry Pi, Arduino device, MP3 players, wearable devices, fitness trackers, digital audio players, and digital media players.

The housing of the present invention provides a protective cushioning layer around the components of the mobile electronic device. Such cushioning protects the device from drops, falls, or other damage to the device.

The housing also provides a positioning frame and a support rib that extend across the components of the device. The positioning frame and support rib of one embodiment are located internal of the housing. In another embodiment, the positioning frame is located internal of the housing. The positioning frame and the support rib limit deformation of the components of the device to reduce the likelihood of damaging the device.

In one embodiment, the housing secures the device to prevent unauthorized access. Most devices provide a port for accepting a charger. The charging port may accept USB, USB micro, USB mini, Lightning, or other electrical insertion connection. New connections with new ports will more than likely be developed in the future. The housing of one embodiment blocks access to such a port. In another embodiment, the port has been removed from the device. In another embodiment, the housing blocks access to buttons and other features of the device. Eliminating access to these features prevents users from gaining unauthorized access to the device. The housing also prevents users from resetting the device to allow unfettered access to the user.

It is an object of the present invention to protect a device.

It is an object of the present invention to cushion (reduce shock) the components of the device.

It is an object of the present invention to provide an internal structure within the housing that reduces deformation on components of the device.

It is an object of the present invention to provide additional protection to the device.

It is another object of the present invention to reduce access to the mobile electronic device.

It is another object of the present invention to obstruct buttons on the device to prevent users from accessing certain features of the mobile electronic device.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
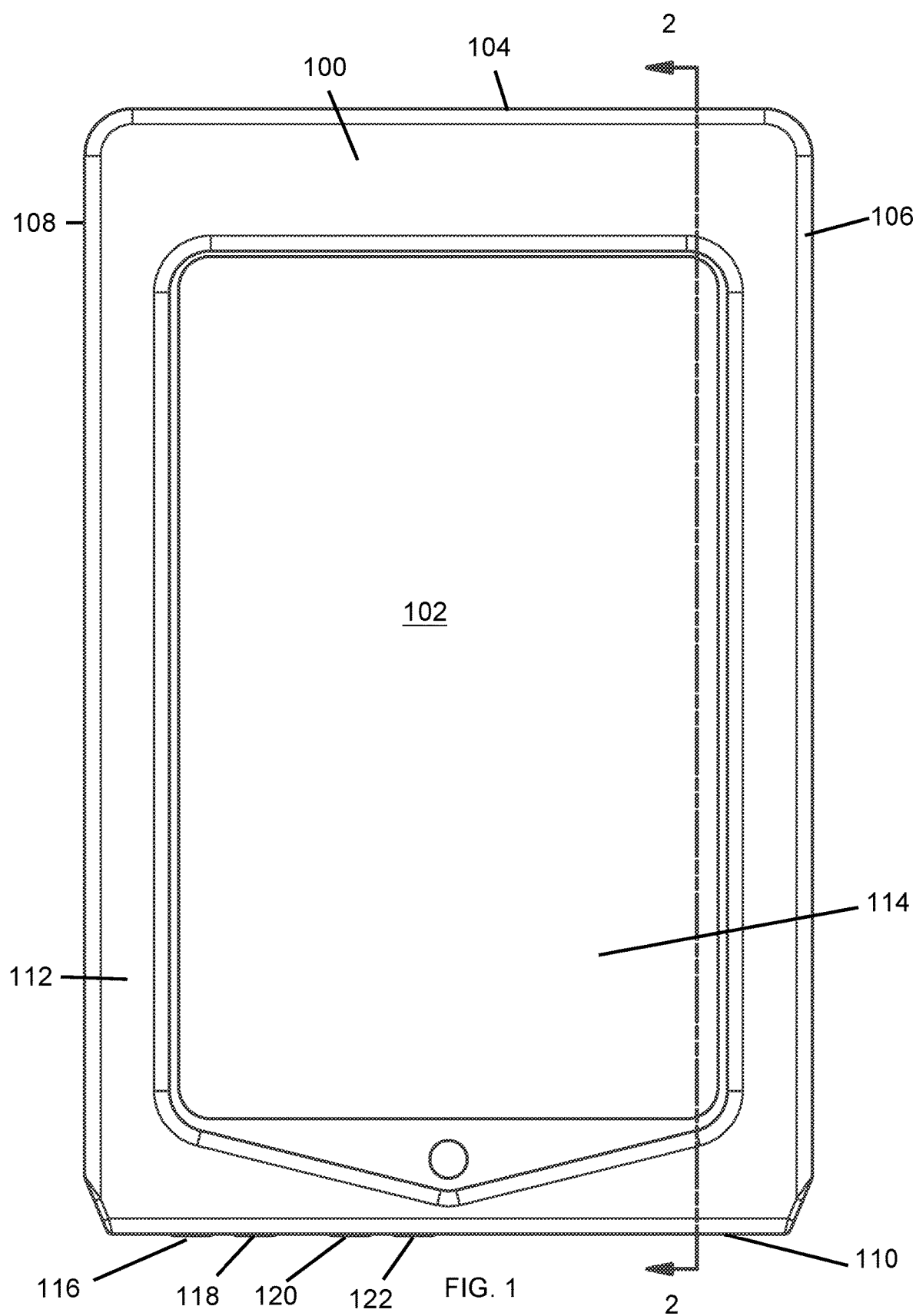
FIG. 1 is a front view of one embodiment of the present invention.

FIG. 1 shows an environmental view of one embodiment of the housing 100 on the mobile electronic device 102. The housing 100 partially encompasses the mobile electronic device 102 to protect the device. A viewing window 114 in the housing provides access to the display and the touchscreen. Walls 104, 106, 108, 110 form the outer edge of the housing 100. In one embodiment, walls 104, 106, 108, 110 provide no access to the device 102. Instead, contacts 116, 118, 120, 122 extend outward from the device for charging and for communication, such as the contact discussed in U.S. patent application Ser. No. 16/033,045 entitled SECURE CHARGING SYSTEM FOR ELECTRONIC DEVICES filed on Jul. 11, 2018 which is incorporated herein by reference. In such an embodiment, the walls 104, 106, 108, 110 prevent access to any ports or other buttons that allow resetting the device or unauthorized access of the device.

In one embodiment, the housing 100 is constructed from a rigid material, including but not limited to plastic, metal, polyurea plastic, aluminum, a semi-rigid material, or other rigid material. In one embodiment, the housing 100 is formed around the mobile computing device, such that the housing is constructed from a single, unitary piece of rigid material. The computing device is placed within a mold. The plastic is then applied into the mold to form the housing around the computing device. A protective shield is placed in the mold to limit the amount of the plastic hardening on the display of the mobile electronic device. The plastic is injected into the mold to form a single unitary housing around the mobile electronic device.

Different embodiments of the present invention may provide different outer layers of the housing. In one embodiment, the housing provides a hard, rigid surface as the exterior of the housing. In another embodiment, an outer cushioning layer, such as a shock absorption layer, may be located as the outermost surface to provide additional impact resistance. Different embodiments of the present invention may provide different types of outer layers depending on the environment in which the device is used. One embodiment provides a hard, rigid surface as the outermost surface of the housing. Another embodiment provides an outer cushioning layer as the outer layer of the housing.

The housing constructed from a single, unitary piece eliminates seams within the housing 100. Seams within the housing create a weak point in the housing. A person can insert objects into the seam to break the housing off the mobile electronic device. Eliminating the seams increases the difficulty of removing the housing from the mobile electronic device. Installation of the housing 100 on the mobile computing device 102 will be described in greater detail below.

Figure 2:
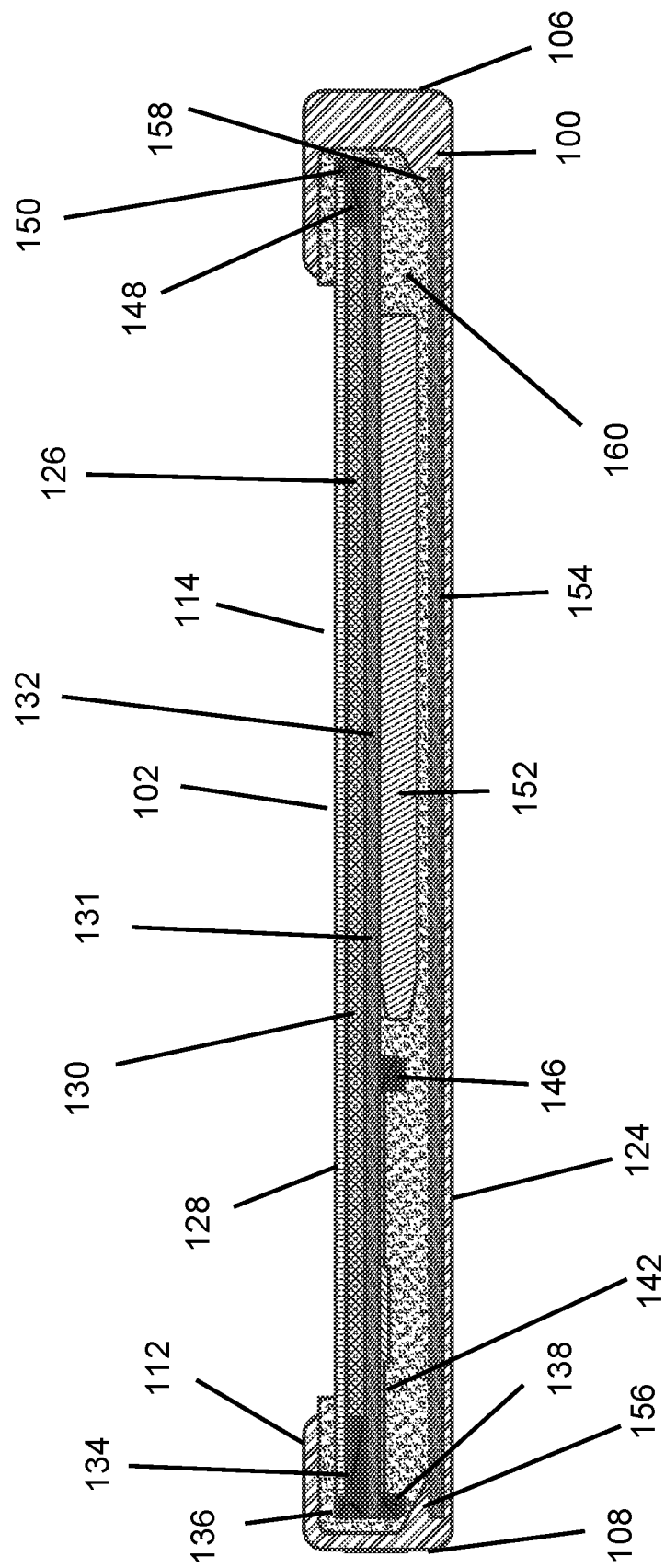
FIG. 2 is a sectional view thereof.

FIG. 2 shows a cross-section of the housing 100 and the mobile electronic device 102 within the housing. The housing 100 stores the components of the mobile electronic device. Such components include, but are not limited to a display, such as LCD panel 130, an input device, such as touchscreen 128, a circuit board 142, such as a printed circuit board, and a battery 152. A heat sink or other thermal management device or material may be placed adjacent the circuit board 142. The housing 100 stores the components in a functioning arrangement to allow usage of the mobile electronic device. As discussed above, the housing of one embodiment limits access to the mobile electronic device while allowing usage of the device.

A positioning frame 131 provides additional structure and rigidity to the housing 100 with positioning fingers, positioning arms, and a positioning rib. The positioning rib 132 of one embodiment is constructed from carbon fiber. Other embodiments of the positioning rib are constructed from a metal such as aluminum, magnesium, or a combination thereof, or a rigid material such as high stiffness plastics. The positioning rib 132 provides positioning arms 134, 148 that extend laterally from the positioning rib towards the front wall 112. These positioning arms 134, 148 are constructed from a rigid material, such as plastic or polyurea plastic. Positioning fingers 136, 150 extend laterally from the positioning arms towards the front wall 112.

In one embodiment, the positioning rib, the positioning arms, the positioning fingers, and the positioning legs are constructed from a single unitary piece of rigid material, including but not limited to carbon fiber, aluminum, or magnesium. In another embodiment, the positioning rib, the positioning arms and positioning fingers, and the positioning legs are constructed from the same rigid material, including but not limited to carbon fiber, aluminum, or magnesium. The positioning arms and fingers of one embodiment may be constructed from individual components and secured to the positioning rib.

In one embodiment, the positioning arms 134, 148 with positioning fingers 136, 150 are constructed from a different material than the positioning rib 132. Such an embodiment provides a positioning rib constructed from a rigid material, including but not limited to carbon fiber, aluminum or magnesium. The positioning arms and fingers are constructed from plastic, such as polyurea plastic. The positioning arms and fingers attach to the positioning rib.

The positioning arms 134, 148 form a display aperture for placement of the display 126. In one embodiment, the display 126 is an LCD 130. The display 126 abuts the positioning rib 132. The positioning rib 132 supports the display 126 to reduce deformation on the display 126. The display 132 is located fore of the positioning rib 132 towards the front wall 112 of the housing 100. The display 126 is positioned between the positioning arms 134, 148. These positioning arms 134, 148 abut the display 126 to position the display 126, such as LCD panel 130, within the housing 100.

The positioning fingers 136, 150 extended laterally from the positioning arms 134, 148 towards the front wall 112. The positioning fingers 136, 150 extending fore of the display 126 provides an opening for placement of the input device, such as touchscreen 128. The positioning fingers 136, 150 position the touchscreen 128 in front of the LCD panel 130 or display 126.

The positioning rib 132 positions the LCD panel 130 with positioning arms 134, 148 and positions the touchscreen 128 with positioning fingers 136, 150. The positioning rib 132 also positions the circuit board 142 and the cushioning 160, such as foam. Positioning rib 132 positions the circuit board 142 aft of the positioning rib 132. Positioning legs 138, 146 extend laterally aft of the positioning rib 132.

In one embodiment, the positioning legs 138, 146 are constructed from a different material than the positioning rib 132. Such an embodiment provides a positioning rib constructed from a rigid material, including but not limited to carbon fiber, aluminum, or magnesium. The positioning legs of such an embodiment are constructed from plastic, such as polyurea plastic. The positioning legs attach to the positioning rib.

The positioning legs 138, 146 form a board aperture for placement of the circuit board 142. In one embodiment, the circuit board 142 is a printed circuit board 142. The circuit board 142 abuts the positioning rib 132. The positioning rib 132 supports the circuit board 142 to reduce deformation on the circuit board 142. The circuit board is located aft of the positioning rib 132 towards the rear wall 124 of the housing 100.

The board 142 is positioned between the positioning legs 138, 146. These positioning legs 138, 146 abut the board 142 to position the board 142 within the housing 100.

Positioning legs 138, 146 extend laterally aft towards the rear wall 124. The positioning legs 138, 146 anchor the positioning rib 132 in the cushioning 160. Such anchoring within the cushioning 160 positions the positioning rib 132 and the components of the mobile electronic device 102.

The battery 152 abuts the positioning rib 132 to provide additional support for the battery 152. As discussed above, the positioning rib 132 reduces deformation on the battery 152.

Cushioning 160, such as foam, is installed around the positioning frame 131. The foam provides cushioning around the components of the electronic device. The foam is located between the walls of the housing and the components of the electronic device. Foam is positioned in front of the touchscreen 128 between the touch screen and the front wall. The foam provides a viewing window. Foam is also positioned to the sides of the components and positioning frame 131. Foam is also positioned behind the components and positioning frame 131. Foam is also located above and below the components and positioning frame 131. The foam encases the components similar to the housing 100. In one embodiment, the foam is positioned between the components and the walls of the housing. In such an embodiment, foam is also positioned between the positioning frame and the walls of the housing.

The foam can be of various densities. The foam provides impact resistance to the electronic device. The foam of one embodiment is not electrically conductive. The foam of one embodiment is thermally conductive to distribute heat from the electronic device.

Additives may be added to the foam to provide additional beneficial qualities to the foam. Flame retardant and/or anti-microbial additives may be added to the foam.

The foam also provides positioning pressure for positioning the positioning frame and the components in the housing. The positioning legs anchor into the foam for positioning the components and positioning frame within the housing. Such positioning pressure provided by the foam of one embodiment of the present invention eliminates the need for some adhesives, screws, and other fasteners to maintain the components in place.

The foam also increases the ruggedness of the device for harsh environmental conditions. The foam provides strong protection against both water and gas penetration into the components. The foam also limits the amount of water, chemicals, and dust to which the components are exposed.

To limit the deformation on the internal components and provide support to the housing, an additional support rib 154 is positioned adjacent the rear wall 124 of the housing 100. The support rib 154 abuts the rear wall 124. Wall extensions 156, 158 angle downward and inwards towards the rear wall 124. The wall extensions 156, 158 form an opening for placement of the support rib 154. The wall extensions 156, 158 lock the support rib 154 into position adjacent the rear wall 12.

The housing 100 provides an outer layer of protection for the electronic device. The housing 100 protects against impacts. The housing of one embodiment is constructed from plastic via standard injection molding. Another embodiment is constructed from sprayed or molded plastic such as polyurea mixtures. Another embodiment is constructed from welded polycarbonate.

For anti-intrusion scenarios, the plastic selected for the housing is resistant to cracking. Such plastic affixes to the electronic device in a non-removable fashion. The housing of such an embodiment is formed around the components of the electronic device. Such molding of the housing around the components creates a seamless case for the electronic device.

Additives may also be added to the structure of the housing. Such additives may include antimicrobial agents and fire-retardant agents. These agents added to the housing provide beneficial qualities to the housing.

Figure 3:
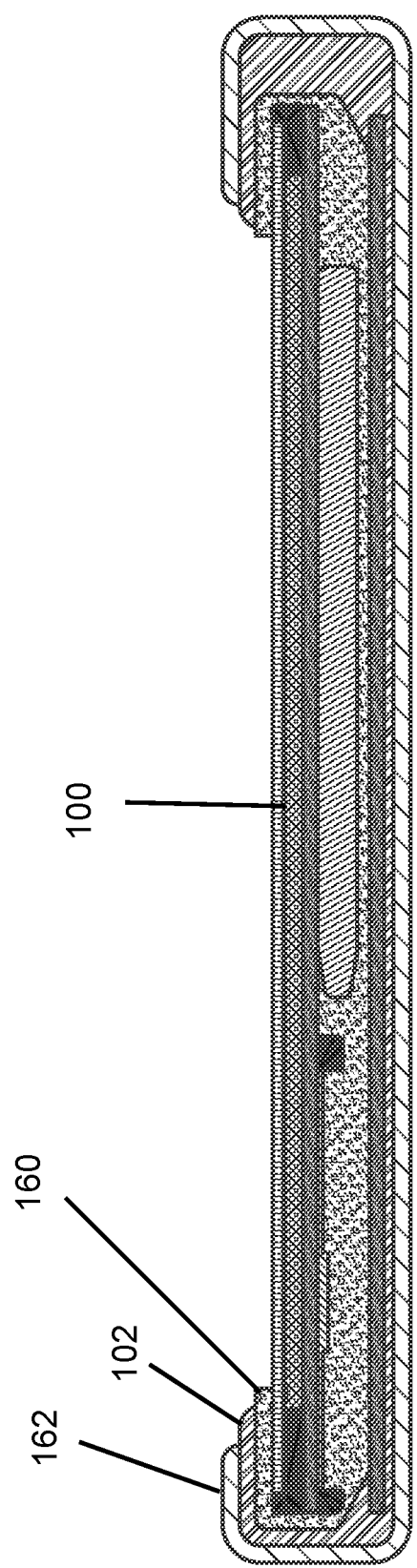
FIG. 3 is a sectional view of another embodiment of the present invention.

In some embodiments, the housing as shown in FIG. 3 provide an additional outer layer at the outer surface of the walls. Such a layer may include but is not limited to a shock absorption layer 162 located exterior to the security shell of the housing 102. In one embodiment, the shock absorption layer 162 is thicker to increase impact resistance. In one embodiment, the shock absorption layer is constructed from a foam similar as foam 160. In another embodiment, the shock absorption layer is constructed from silicone, rubber, foam or other viscoelastic material. Such a softer layer also provides a softer outer layer of the housing if a user chooses to weaponize the device by hitting or striking a person with the device and the housing.

To create the seamless case, the components are positioned onto the positioning frame as shown in FIG. 2. The display, such as the LCD panel is placed between the positioning arms of the positioning rib. The touchscreen is then positioned over the display between the positioning fingers. The board is placed between the positioning legs. The battery is placed adjacent the positioning rib. Foam is then applied to the components and the positioning frame. The foam and components are then placed within a mold along with the support rib. The plastic is then applied to the components, foam, and ribs to form the housing. The plastic cures to form the seamless housing.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A protective device for protecting a mobile electronic device by providing rigid support within the housing and providing impact resistance to components of the electronic device, the device comprising:
    a housing for storing the components of the electronic device;
    a viewing window of the housing;
    a positioning frame placed within the housing wherein the positioning frame is constructed from a rigid material, the positioning frame separate from the housing; and
    a display located adjacent the positioning frame, the display showing an image through the viewing window, wherein the positioning frame abuts the display and directly contacts a majority of the display, the display located between the viewing window and the positioning frame;
    the display extending longitudinally along the viewing window, wherein the positioning frame extends longitudinally across a rear surface of the display, wherein the positioning frame extends longitudinally across the entire rear surface of the display;
    a first positioning arm extending from the positioning frame toward the viewing window;
    a second positioning arm extending from the positioning frame toward the viewing window;
    the display located between the first positioning arm and the second positioning arm, wherein the display abuts the positioning frame and directly contacts the positioning frame, the first positioning arm, and the second positioning arm.

2. The device of claim 1 further comprising:
    a first positioning finger extending from the first positioning arm toward the viewing window;
    a second positioning finger extending from the second positioning arm toward the viewing window;
    a touchscreen located between the first positioning finger and the second positioning finger, wherein the touchscreen abuts the display.

3. A protective device for protecting a mobile electronic device by providing rigid support within the housing and providing impact resistance to components of the electronic device, the device comprising:
    a housing for storing the components of the electronic device wherein the housing provides a front wall, a rear wall located opposite the front wall, a first side wall, a second side wall, a top wall, and a bottom wall;
    a viewing window of the housing in the front wall;
    a positioning frame placed within the housing between the front wall, the rear wall, the first side wall, the second side wall, the top wall, and the bottom wall;
    a positioning rib of the positioning frame wherein the positioning rib is constructed from a rigid material, wherein the positioning rib is located between the front wall and the rear wall;
    a display abutting the positioning rib to directly contact the positioning rib, wherein the display is located between the viewing window and the positioning rib; and
    a circuit board abutting the positioning rib within the housing to directly contact the positioning rib, wherein the positioning rib is located between the circuit board and the display.

4. The device of claim 3 wherein the positioning rib is constructed from carbon fiber.

5. The device of claim 4 further comprising:
    a first positioning arm extending from the positioning rib toward the front wall;
    a second positioning arm extending from the positioning rib toward the front wall;
    the display located between the first positioning arm and the second positioning arm, wherein the display abuts the positioning rib and directly contacts the positioning rib, the first positioning arm, and the second positioning arm.

6. The device of claim 5 further comprising:
    a first positioning finger extending from the first positioning arm toward the front wall;
    a second positioning finger extending from the second positioning arm toward the front wall;
    a touchscreen located between the first positioning finger and the second positioning finger, wherein the touchscreen abuts the display.

7. The device of claim 6 wherein the first positioning finger, the second positioning finger, the first positioning arm, and the second positioning arm are constructed from plastic and secured to the positioning rib.

8. The device of claim 4 further comprising:
    a first positioning leg of the positioning frame extending away from the positioning rib toward the rear wall;
    a second positioning leg of the positioning frame extending away from the positioning rib toward the rear wall, wherein the circuit board is located between the first positioning leg and the second positioning leg.

9. The device of claim 4 further comprising:
    a battery located adjacent the positioning rib wherein the battery abuts the positioning frame, wherein the positioning rib is located between the battery and the display.

10. The device of claim 4 further comprising:
    a support rib abutting the rear wall of the housing.

11. The device of claim 10 further comprising:
    a first wall extension extending inward from the first side wall of the housing;
    a second wall extension extending inward from the second side wall of the housing wherein the first wall extension and the second wall extension contact the support rib to secure the support rib adjacent the rear wall of the housing.

12. The device of claim 4 further comprising:
foam installed within the housing wherein the foam is located between a rear wall of the housing and the display.

13. The device of claim 12 wherein the foam separates the positioning frame from the housing.

14. The device of claim 13 wherein the foam provides a fire-retardant agent.

15. The device of claim 3 wherein the housing provides an anti-microbial agent.

16. A protective device for protecting a display, a touchscreen, a circuit board, and a battery of a mobile electronic device by providing rigid support within the housing and providing impact resistance to components of the electronic device, the case comprising:
- a positioning frame configured to accept a display;
- a positioning rib of the positioning frame wherein the positioning rib is constructed from a rigid material;
- a first positioning arm extending from a first side of the positioning rib;
- a second positioning arm extending from the first side of the positioning rib wherein the first positioning arm and second positioning arm are located a distance apart to form a display aperture for receiving the display;
- the display located between the first positioning arm and the second positioning arm, wherein the display abuts the first side of the positioning rib, the display showing an image from a front side of the display, the positioning rib contacting a rear side of the display, the positioning rib extending longitudinally across the rear side of the display, wherein the positioning rib extends longitudinally across the entire rear side of the display.

17. The device of claim 16 further comprising:
- a first positioning finger extending from the first positioning arm away from the positioning rib;
- a second positioning finger extending from the second positioning arm away from the positioning rib wherein the positioning fingers are located a distance apart to form a touchscreen aperture for receiving the touchscreen;
- the touchscreen located between the first positioning finger and the second positioning finger, wherein the touchscreen abuts the display.

18. The device of claim 17 wherein the distance between the positioning fingers is greater than the distance between the positioning arms.

19. The device of claim 16 further comprising:
- A second side of the positioning rib located opposite of the first side;
- a first positioning leg extending from the second side of the positioning rib;
- a second positioning leg extending from the second side of the positioning rib wherein the first positioning leg and second positioning leg are located a distance apart to form a board aperture for receiving the circuit board;
- the circuit board located between the first positioning leg and the second positioning leg, wherein the circuit board abuts the positioning rib to contact the positioning rib, the first positioning leg, and the second positioning leg.

* * * * *